United States Patent

Chuzenji

[11] Patent Number: 5,805,319
[45] Date of Patent: Sep. 8, 1998

[54] CIRCUIT FOR DISCRIMINATING THE PRESENCE OF EXTRAORDINARINESS IN AN OUTPUT SIGNAL

[75] Inventor: Tomohiro Chuzenji, Tokyo, Japan

[73] Assignee: NEC Corporation, Tokyo, Japan

[21] Appl. No.: 783,024

[22] Filed: Jan. 14, 1997

[30] Foreign Application Priority Data

Jan. 19, 1996 [JP] Japan ................................. 8-025772

[51] Int. Cl.⁶ .................................................. H04B 10/08
[52] U.S. Cl. .......................................... 359/110; 359/177
[58] Field of Search ................................... 359/110, 157, 359/161, 173, 176–177, 179, 187–188, 195

[56] References Cited

U.S. PATENT DOCUMENTS 5,644,423   7/1997   Iwano ....................................... 359/177

FOREIGN PATENT DOCUMENTS 0411188   2/1991   European Pat. Off. ................ 359/110
2242091   9/1991   United Kingdom ................... 359/177

Primary Examiner—Kinfe-Michael Negash
Attorney, Agent, or Firm—Scully, Scott, Murphy & Presser

[57] ABSTRACT

It is the object of the invention to provide an extra ordinariness-discriminating circuit for an optical signal, which discriminates whether an output signal of an optical direct amplifier is a STM one or a signal being other than a STM one, such as ASE noise and etc., and examines the presence of an extraordinary optical signal. A portion of the output signal of the optical direct amplifier is branched by an optical coupler, and converted into an electrical signal by an O/E converter and divided in two. One of divided electrical signals is supplied to a band pass filter, which extracts 8 KHz component to be detected by the first detector, and the other one is directly supplied to the second detector and detected therein. Both the detected voltages are supplied to a comparator. When the output signal of the optical direct amplifier is the STM signal, the difference of the input powers detected by the comparator is smaller than that obtained in a case where the input optical signal is other than the STM signal, and thereby one can detect whether the output optical signal of the optical direct amplifier is the STM signal or not.

4 Claims, 3 Drawing Sheets

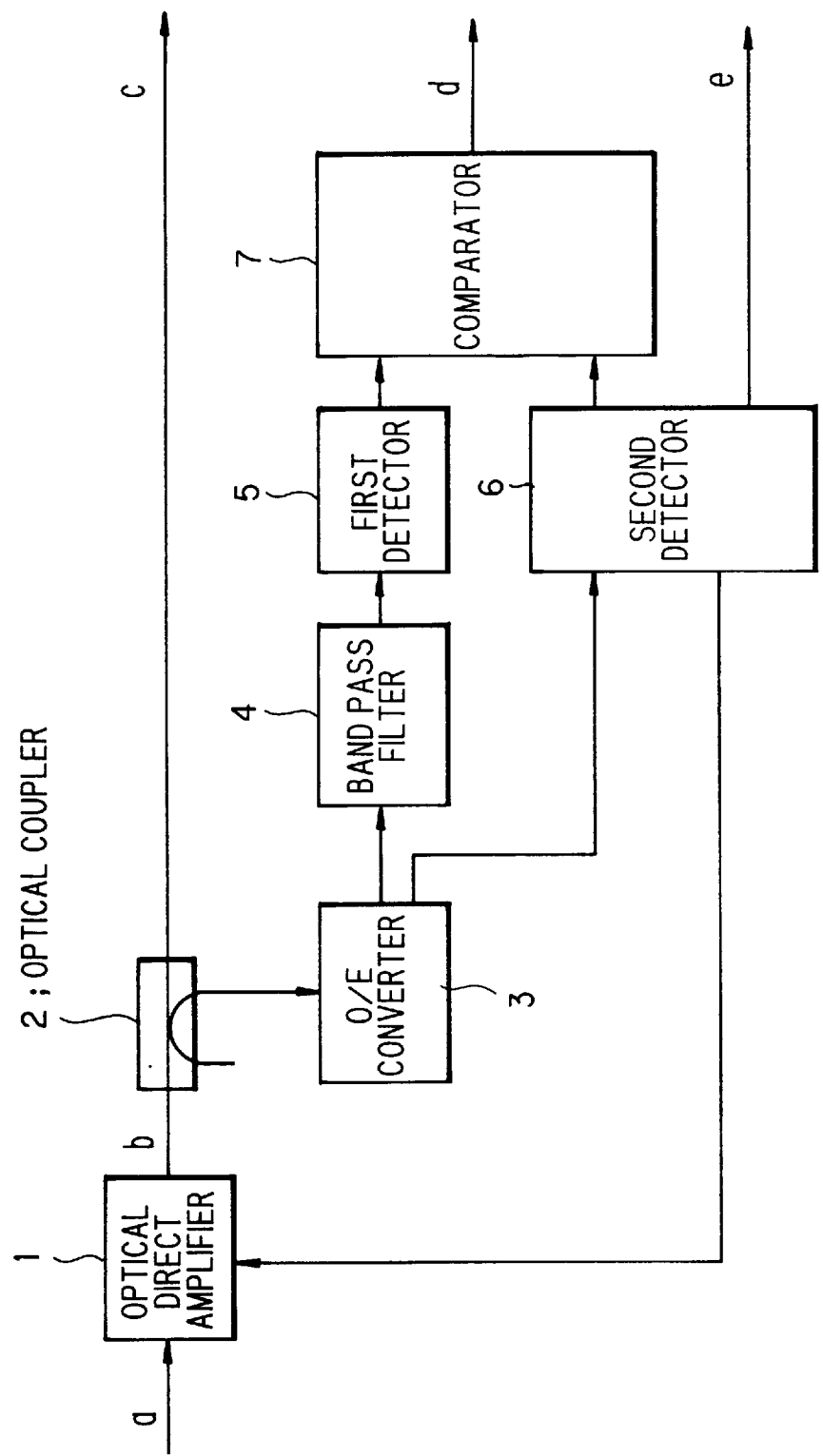

POWER SPECTRUM OF STM-N SIGNAL

CIRCUIT FOR DISCRIMINATING THE PRESENCE OF EXTRAORDINARINESS IN AN OUTPUT SIGNAL

FIELD OF THE INVENTION

The invention relates to an extra ordinariness-discriminating circuit for an optical signal, and especially to a control circuit used in an optical repeater for a synchronous transfer mode (STM, hereinafter) signal transmission, which discriminates whether the output signal of an optical direct amplifier is a STM signal or not, and generates an alarm signal for notifying the presence of extraordinariness in the aforementioned output optical signal.

BACKGROUND OF THE INVENTION

In an optical communication through an optical fiber, it is very important to discriminate the presence of an extraordinary optical signal in order to secure the reliability of the communication system. The outline of a conventional extraordinariness-discriminating circuit for the optical signal can be summarized as follows. The input optical signal supplied to an optical repeater is amplified by an optical direct amplifier therein, and branched into two by an optical coupler. One of the branched optical signals is converted into an electrical signal by an O/E converter and detected by a power detector. Extraordinariness of the optical signal is discriminated according to the output level of the power detector.

However, the aforementioned circuit according to the conventional technology detects only extraordinariness of the power level of the input optical signal, and can not discriminate whether the STM signal is supplied or not. Accordingly, the circuit can not discriminate the extraordinariness of the input optical signal, even when amplified spontaneous emission noise (ASE noise, hereinafter), continuous lightwave (CW, hereinafter), etc. is supplied.

SUMMARY OF THE INVENTION

The invention is made in view of the aforementioned situation, and it is the object of the invention to overcome the disadvantages and provide a circuit for discriminating whether the output signal of the optical direct amplifier is the STM signal or not by making the output signal of the O/E converter pass through a band pass filter.

According to the feature of the invention, an extraordinariness-discriminating circuit for an optical signal comprises:

an optical direct amplifier in an optical repeater for amplifying an input optical signal, an optical/electrical converter (an O/E converter, hereinafter) applied to a portion of an output signal of the optical direct amplifier, filter means for extracting a frequency component corresponding to a period of a frame pulse of the output signal of the optical direct amplifier from an output signal of the O/E converter, and means for discriminating a presence of extraordinariness in the output signal of the optical direct amplifier based on a level of the frequency component corresponding to the period of the frame pulse.

The principle of the invention can be summarized as follows. In the present invention, the output optical signal amplified by the optical direct amplifier is branched into two by an optical coupler, and one of the branched optical signals is converted into the electrical signal, which passes through the band pass filter for extracting a frequency component of, for instance, 8 KHz corresponding to a period of a frame pulse, so that thereby one can discriminate whether the output signal of the optical direct amplifier is a STM signal or not.

Since the power spectrum of the STM signal has no spectral component in a frequency range of 0 to 8 KHz, the optical signal is regarded as the STM signal, when a certain power level is not detected from the output signal of the band pass filter with a band width of 8 KHz, for example. When the certain power is detected from the output of the band pass filter, the optical signal amplified by the optical direct amplifier is decided to be AES noise with a uniform spectrum, being other than the STM signal. Moreover, the discriminating circuit according to the invention comprises means for examining the presence of the input signal, and thereby an alarm signal, such as a clock-down-alarm signal, and 3R functions are suitably applied to external circuits, where 3R functions mean a reshaping function for compensating attenuation and waveform distortion, a retiming function for eliminating jitters and a regenerating function for discriminating marks and eliminating noises.

BRIEF DESCRIPTION OF THE DRAWINGS

The invention will be explained in more detail in onjunction with the appended drawings, wherein:

FIG. 2 is a block diagram showing a structure of an extraordinariness-discriminating circuit for an optical signal in the first preferred embodiment of the invention.

DESCRIPTION OF THE PREFERRED EMBODIMENTS

Before explaining an extraordinariness-discriminating circuit for an optical signal in the preferred embodiment of the invention, the aforementioned conventional extraordinariness-discriminating circuit for an optical signal will be explained.

Figure 1:
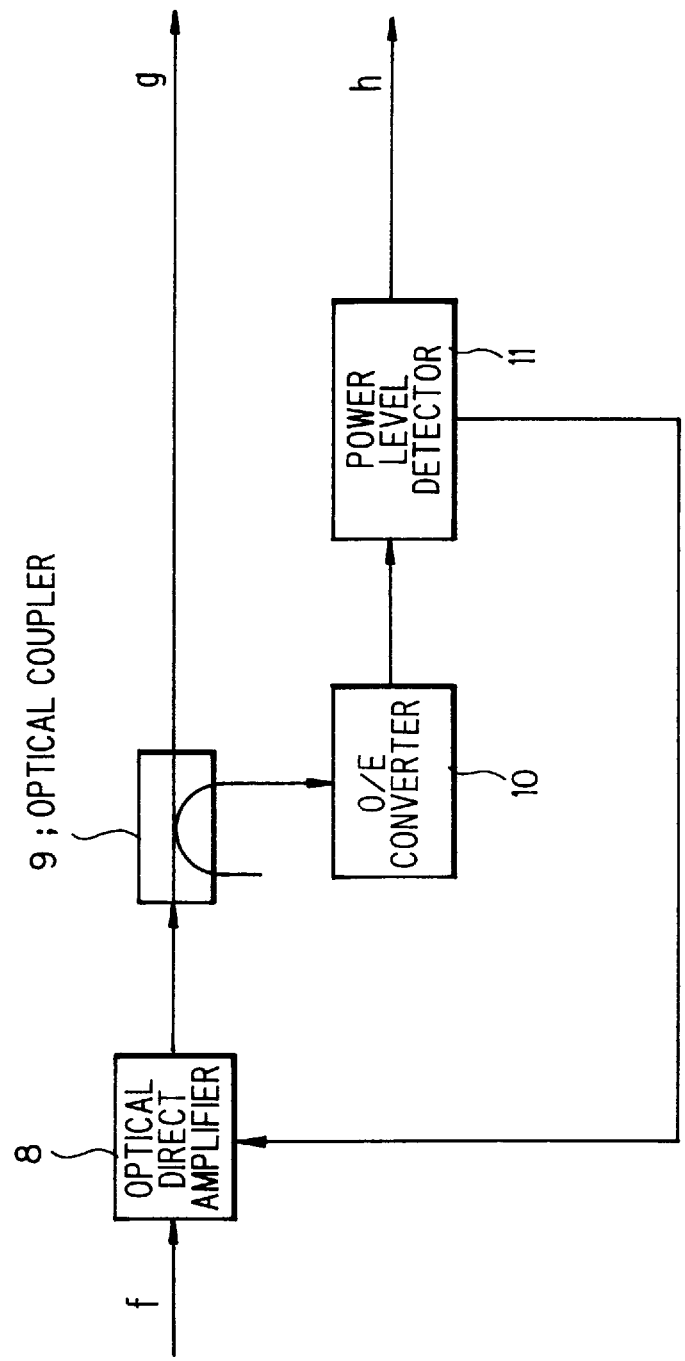
FIG. 1 is a block diagram showing a structure of a conventional extraordinariness-discriminating circuit for an optical signal.

In the conventional extraordinariness-discriminating circuit for the optical signal, the presence of the extraordinary output signal of an optical direct amplifier is discriminated by a circuit shown in FIG. 1.

An input optical signal f is amplified by an optical direct amplifier 8 and branched in two by an optical coupler 9. One of branched optical signals is converted into an electrical signal by an O/E converter 10, and extraordinariness of an output signal is detected by a power level detector 11. A detected power level is fed back to the optical direct amplifier 8, and the power level is automatically controlled to be constant. This operation is called Auto Level Control (ALC, hereinafter).

Hereafter, the embodiment of the invention will be explained in detail referring to the appended drawings.

FIG. 2 is a block diagram showing the structure of the preferred embodiment of the invention. The aforementioned embodiment of the invention is composed of an optical direct amplifier 1 for amplifying an input optical signal a, an optical coupler 2 for branching the output signal of the optical direct amplifier 1 in two, an OIE converter 3 for converting one of branched optical signals into an electrical signal, a band pass filter 4 for extracting a 8 KHz component, corresponding the period of a frame pulse, from an electrical signal supplied from the O/E converter 3, the first detector 5 for detecting the power of the electrical signal passing through the band pass filter 4, the second detector 6 for detecting an electrical signal, which dose not pass through the band pass filter 4, in other words, is an electrical power directly supplied from the O/E converter 3, and a comparator 7, which compares the output powers of the first and second detectors 5 and 6. The powers supplied to the band pass filter 4 and the second detector 6 from the O/E converter 3 have the same magnitudes. The comparator 7 generates an alarm signal d notifying the presence of the extraordinary optical signal in accordance with the result of comparison of two input powers. The output power of the second detector 6 is fed back to the optical direct amplifier 1 for ALC.

Figure 3A:
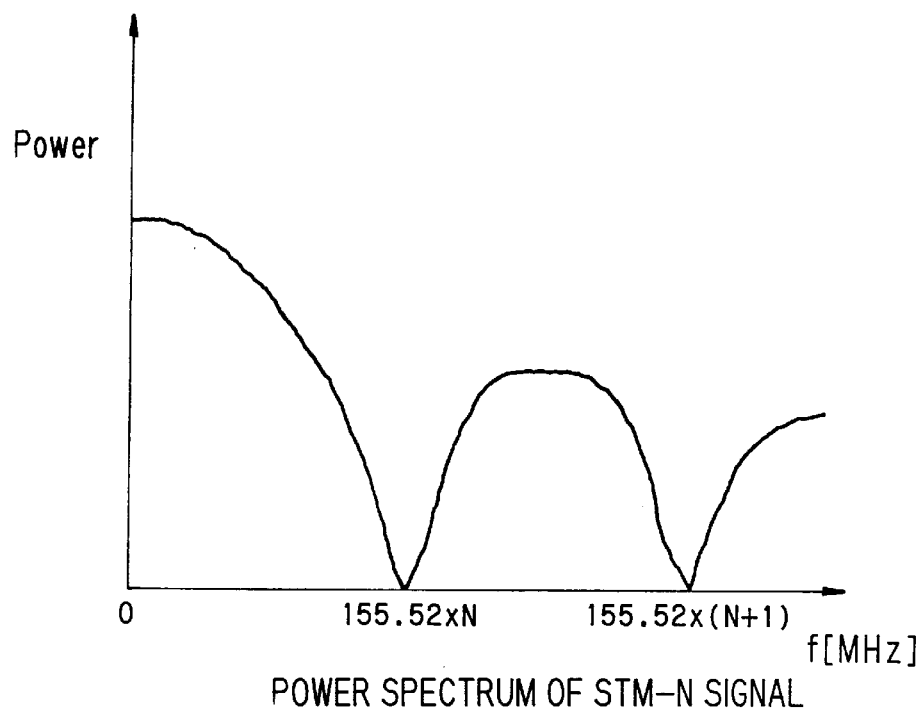
FIG. 3A shows a power spectrum of a STM-N signal, where N is a natural number.
Figure 3B:
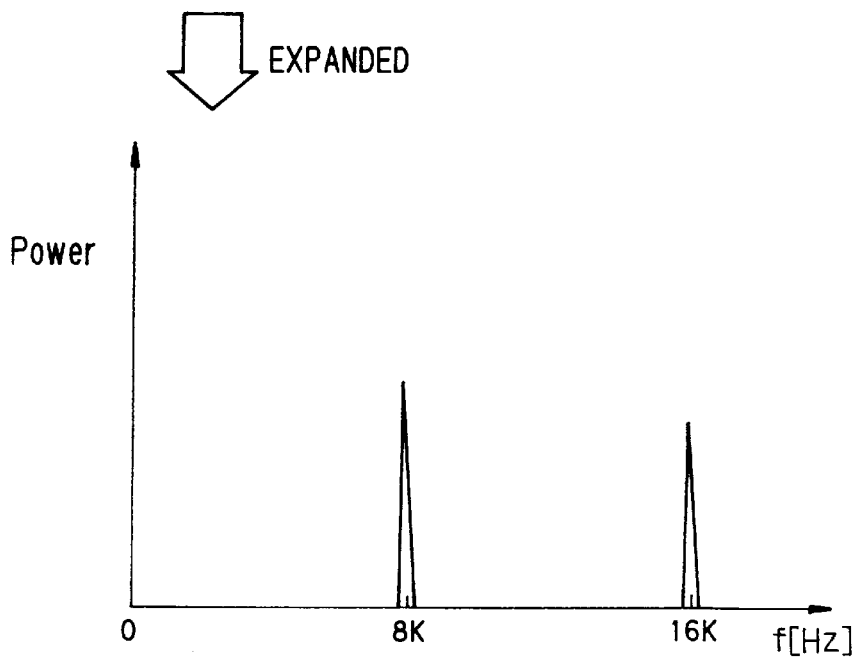
FIG. 3B is an enlarged diagram of a portion of FIG. 3A.

FIG. 3A and FIG. 3B show the power spectrum of a STM-N signal, where N is a natural number, being 1, 4 or 16 in most cases. FIG. 3B is an enlarged diagram of a portion of FIG. 3A. As shown in FIG. 3B, a spectral component of 8 KHz of the power spectrum corresponds to the period of the frame pulse of the STM-N signal, and the one of 16 KHz corresponds to a second harmonics of the frame pulse. The power spectrum of the STM-1 signal with the band width of 155.52 MHz has no spectral component in a frequency range of 0 to 8 KHz.

Next, the operation of the preferred embodiment of the invention will be explained referring to the appended drawing, FIG. 2.

An input optical signal a is amplified by the optical direct amplifier 1, the output signal of which is branched in two by the optical coupler 2, and one of branched optical signals is converted into an electrical signal by the O/E converter 3. Means for ALC and generating an alarm signal e in case of decrease of the input optical signal level, both being carried out by the aid of the second detector 6, are similar to those used in the conventional technology shown in FIG. 1, An output electrical signal of the O/E converter 3 is supplied to the band pass filter 4 and the second detector 6.

The frequency component corresponding to the period of the frame pulse is extracted by the band pass filter 4. The output power of the band pass filter 4 is detected by the first detector 5, the output power of which is supplied to the comparator 7 together with the output power of the second detector 6.

When the output signal b of the optical direct amplifier 1 is a STM signal, the difference of the output powers of the first and second detectors 5 and 6, which is detected by the comparator 7, is smaller than the one obtained in case that the optical signal b is other than a STM signal.

Thereby, the circuit shown in FIG. 2 can discriminate whether the input optical signal a is a STM signal or not.

The second detector 6 generates a clock down-alarm signal e, if the optical signal a is not supplied. As mentioned in the above, the embodiment shown in FIG. 2 discriminates whether the output signal b of the optical direct amplifier 1 is a STM signal or not, and can examine the presence of extraordinariness of the optical signal.

As mentioned in the above, the extraordinariness detecting circuit for the optical signal according to the invention, by making the output signal of the optical direct amplifier pass through the band pass filter for extracting the 8 KHz component, discriminates whether the optical signal is a STM signal or not, and examines the presence of the extraordinary optical signal, even when the optical direct amplifier sends off ASE noises, being other than a STM signal.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A circuit for discriminating the presence of extraordinariness in an output signal, comprising:

an optical direct amplifier in an optical repeater for amplifying an input optical signal, an optical/electrical converter applied to a portion of an output signal of said optical direct amplifier, filter means for extracting a frequency component corresponding to a period of a frame pulse of said output signal of said optical direct amplifier directly from an output signal of said optical/electrical converter, and means for discriminating a presence of extraordinariness in said output signal of said optical direct amplifier based on a level of said frequency component corresponding to said period of said frame pulse.

2. The circuit, according to claim 1, wherein:

said filter means is a band-pass-filter and connected to an output terminal of said optical/electrical converter, said means for discriminating comprises;

a first detector for detecting an output power of said band-pass-filter, a second detector for detecting an output power of said optical/electrical convertor, and a comparator for comparing said output powers of said first and second detectors, and generating a signal for notifying whether said output signal of said optical direct amplifier is a synchronous transfer mode signal or not in accordance with a result of comparison, wherein said output power of said second detector serves as an auto level control voltage supplied to said optical direct amplifier.

3. A circuit for detecting a defect of a light signal having frame pulses to identify frames, comprising:

an optical transmitter for transmitting said light signal through an optical fiber transmission line;

an optical amplifier for directly amplifying said light signal at a predetermined point of said optical fiber transmission line;

an optical receiver for receiving said light signal transmitted through said optical fiber transmission line after being amplified by said optical amplifier;

an optical-to-electrical converter for converting a part of said light signal thus amplified to an electrical signal;

means for sampling a frequency component directly from said electrical signal corresponding to a period of said frame pulses of said light signal; and means for detecting a presence of said frequency component thus sampled, said defect of said light signal being detected, when non-presence of said frequency component is detected.

4. The circuit as defined in claim 3, wherein:

said detecting means, comprises:

first means for detecting an output power of said sampling means;

means for comparing said output power of said sampling means and said power of said electrical signal;

wherein said comparing means generates a signal to detect whether said light signal amplified by said optical amplifier is a STM signal or a signal other than said STM signal; and said second detecting means generates a defect signal in accordance with said power of said electrical signal and controls a level of said optical amplifier.

* * * * *